United States Patent [19]

Sagues

[11] Patent Number: 4,639,884
[45] Date of Patent: Jan. 27, 1987

[54] METHOD AND APPARATUS FOR MEASURING VELOCITY AND POSITION IN SERVO SYSTEMS

[75] Inventor: Paul Sagues, Berkeley, Calif.

[73] Assignee: Berkeley Process Control, Inc., Berkeley, Calif.

[21] Appl. No.: 586,250

[22] Filed: Mar. 5, 1984

[51] Int. Cl.$^4$ .................. G01P 3/42; G06F 15/20
[52] U.S. Cl. .................. 364/565; 318/603; 324/165; 340/347 P; 340/672
[58] Field of Search .................. 318/602, 603, 608; 324/165, 166, 175, 177; 340/347 P, 672; 364/565; 377/17, 20; 123/414, 416

[56] References Cited

U.S. PATENT DOCUMENTS

| | | | |
|---|---|---|---|
| 3,609,307 | 9/1971 | Totsuka et al. | 377/17 X |
| 3,710,265 | 1/1973 | Gray | 324/165 X |
| 3,728,565 | 4/1973 | O'Callaghan | 324/165 X |
| 3,767,902 | 10/1973 | Estes, III et al. | 377/17 X |
| 4,040,026 | 8/1977 | Gernelle | 364/200 |
| 4,094,371 | 6/1978 | Ferrell | 340/347 P X |
| 4,263,590 | 4/1981 | Arnold et al. | 340/672 |
| 4,331,917 | 5/1982 | Render et al. | 340/672 X |
| 4,429,267 | 1/1984 | Veale | 318/594 |
| 4,434,470 | 2/1984 | Thomas et al. | 364/565 |
| 4,520,781 | 6/1985 | Nishida | 123/414 |
| 4,580,046 | 4/1986 | Sasaki et al. | 340/347 P X |
| 4,580,047 | 4/1986 | Sasaki et al. | 340/347 P X |

OTHER PUBLICATIONS

"Shaft Position and Direction Encoder": by Bailey et al., IBM Technical Disclosure Bulletin, vol. 14, No. 1, Jun. 1971, pp. 54 and 55.
"Bi-directional Count from Quadrature Signals": by Hancock, Electronic Engineering, May 1978, p. 24.

*Primary Examiner*—Errol A. Krass
*Assistant Examiner*—Edward R. Cosimano
*Attorney, Agent, or Firm*—Owen, Wickersham & Erickson

[57] ABSTRACT

Method and apparatus for measuring the velocity, whether rotary or reciprocating, of a servo shaft driven by a motor, without employing a tachometer. From the movement of the shaft is produced a pair of signals in quadrature, with transitions expressible in Gray code for one cycle as 00, 01, 11, 10 and then back to 00. Meanwhile, a clock provides a large number of evenly spaced counts per selected quadrature transitions. The number of counts between two selected quadrature transitions is read and the total number of quadrature transitions between the selected transitions is divided by the total number of counts during the same time.

16 Claims, 12 Drawing Figures

FIG_1

FIG_2
(PRIOR ART)

FIG_3 (PRIOR ART)

FIG_4

FIG_5

FIG_6

FIG_7

FIG_8

FIG-9

FIG_10A

FIG_10B

FIG_10C

METHOD AND APPARATUS FOR MEASURING VELOCITY AND POSITION IN SERVO SYSTEMS

This invention relates to apparatus for and method of improved servo control.

BACKGROUND OF THE INVENTION

Important Motion Control Concepts

The term "motion control" is used herein to refer to the process by which a mechanism is moved in a known manner. For example, a tape recorder employs motion control to pull the tape slowly over the "record" and "playback" heads and also to rewind the tape rapidly. The object of such motion control may be to move an object at a known speed or to move the object through a known distance. For example, the tape player must pull the tape across the playback head at a known speed in order that the sound be reproduced faithfully. However, when the tape is being rewound, the constancy of the tension of the tape is of more importance than the constancy of the speed of the tape.

Motion control is used in many industrial processes. Thus, assembly lines and conveyors move at known speeds; plastics and steel are formed as moving sheets; textiles are spun and wound by moving equipment; and robots grasp and move parts by the coordinated action of several motors.

Elements of Motion Control

An actuator is the essential component of any motion control system. The actuator may be electric or fluidic. For example, a DC motor may turn a shaft which, in some manner is connected to a load. While electric motors are probably the most common actuators, electric solenoids play an important role. Fluidic actuators such as air or hydraulic cylinders or air or hydraulic motors are less commonly used but have characteristics which make them desirable in certain situations. Many actuators are cyclic, as for rotating or reciprocating a shaft.

A feedback element may or may not be used in a motion control system. If a motion control system includes a feedback element, it is called a "closed loop" system. If the system does not include a feedback element, it is called an "open loop" system. The parameter fed back may be position, velocity, acceleration, tension, thickness, or any of many other types. The present invention relates to closed-loop systems.

An example of no-feedback versus velocity feedback may be found in phonographs; some use a synchronous AC motor turning at a rate determined by the frequency of the AC line, and such open-loop control of the phonograph speed is very common. However, some more expensive phonographs use velocity feedback, in which a sensor measures the speed of the phonograph platter. If the platter speed becomes too great, the motor driving the platter is commanded to slow down. If the velocity feedback signal indicates that the record platter is turning too slowly, the motor is commanded to speed up. When properly designed, this type of system can achieve better speed control than can be achieved from a synchronous AC motor.

The final element of a motion control system is the controller itself. In the phonograph example, the controller was the element that acted upon the velocity feedback signal and commanded the motor. The controller may be as simple as a switch or as complex as a computer. The function of the controller is to effect a desired goal. For example, the goal of a conveyor system might be to maintain constant belt speed. The conveyor system for an automatic oven might be designed such that the speed of the belt is adjusted so that the product emerging from the oven is cooked properly. The goal of the controller for a textile thread winder may be to maintain constant tension on a thread as a spool is wound.

Thus, a motion control system comprises up to three elements: (1) an actuator causes the motion; (2) an optional feedback element measures position or velocity or both; and (3) a controller applies power to the actuator in order to effect the desired motion goal or controller setpoint. This setpoint may be a desired position, velocity, or acceleration.

The Prior Art

Current motion control systems use both open-loop and closed-loop techniques. A very common open-loop system comprises a controller and a stepping motor. A stepping motor is so designed that when the controller actuates a set of windings within the stepping motor, the stepping motor shaft rotates through a known angle. As long as the controller does not sequence the coils too rapidly and as long as the load is within limits, the stepping motor will follow the controller's command. If these speed or load requirements are violated, however, the stepping motor can miss some steps and then the controller will not know the position of the load. This handicap of stepping motor systems has been tolerated because of the relatively low cost of these systems. The present invention reduces the cost of closed-loop systems and therefore makes the use of open-loop stepping motors less attractive.

Closed-loop systems are more capable than open-loop systems. Open-loop systems have been used primarily because they were less complex and less expensive than closed-loop systems. By using the present invention, a more capable closed-loop system can be built at a cost which is closer to that of the open-loop systems.

Although much of the following discussion is limited to DC motor systems using rotary position and velocity feedback elements, other systems using AC or fluidic motors or linear position feedback elements are equivalent, and the present invention applies to them. The discussion and the present invention is also applicable to systems with AC or fluidic actuators and linear velocity or position feedback sensors.

Tachometers

In typical prior art, a DC motor drives a load, a tachometer, and a rotary position feedback element. The tachometer produces a signal proportional to the rotational velocity of the shaft, and the controller uses the signal from the tachometer to measure the velocity of the load. A rotary position feedback element allows the controller to determine the position of the load and the controller accepts, commands and controls the speed or position of the load.

The controller, given a desired position, determines the position error by taking the difference between the desired position and the actual position as measured by the rotary position feedback element. The controller used this position error to generate a desired velocity. That is, as the position error decreases, so does the desired velocity. The controller then uses the desired velocity and the tachometer velocity feedback signal to determine the value of the motor actuation signal. Motion control systems using a control strategy such as this are used in a myriad of industrial process control applications.

The Desire to Eliminate the Tachometer

Some servo control designers have tried to eliminate the velocity feedback element. Their rationale has been that the tachometer is expensive and requires circuitry which handles the analog signal which tachometers produce. The controller must therefore contain a great deal of analog circuitry, and such circuitry increases the cost and complexity of the controller. The analog circuitry must also be adjusted carefully. Furthermore, these controller designers saw that the velocity is available by differentiating the position information. This is, if the position of the load is noted at two known times, the two position measurements may be subtracted and divided by the time interval in order to give the velocity.

The Problem with Differentiating Position

Thus, prior art workers attempted to eliminate the tachometer by differentiating position to determine the velocity. In the prior art technique, the controller measured the position at fixed intervals of time.

Sometimes, the prior art method can produce a precise velocity. For example, assume that a motion system, which we will call an "axis", is moving at one million (1,000,000) counter per second. Assume that a count is the smallest element of distance which the controller can measure. If the controller samples the position every millisecond (0.001 second), then the velocity may be found by dividing the change is distance by the time.

at time=1,000−sec position=1234 at time=1,001−sec position=1234 velocity=(2234−1234)÷(1.001−1.000)=1000÷0.0001-
=1,000,000 counts per sec.

The precision with which the velocity is measured can be found if the velocity is expressed in counts per sample millisecond (1000/msec). Since a change of one position count can be distinguished, velocity measurement is precise to one part in one thousand or a possible error of no more than 0.1%, assuming that there is a significantly smaller error in timing the sampling of position. This precision is quite good for motion-control systems.

However, there are many situations in which the prior art differentiation technique does not work. For example, assume that the axis is traveling not at one million counts per second but at one thousand counts per second. Assume that the position is sampled every millisecond, as in the first example.

at time=1.000−sec position=1234 at time=1.001−sec position=1235 velocity=(1235−1234)÷(1.001−1.000)=1÷0.001=10-
00/sec.

As in Example 1, the velocity measurement precision is found by expressing the velocity in counts per sample period or counts per millisecond. In this example, the velocity is one count per millisecond (1/msec). The precision is therefore only within one part in one or 100%. A possible error of 100% is poor in any motion control system.

In summary, the prior art's approach to determining the axis velocity by differentiating position fails when the velocity is low. This explains why it is common knowledge that systems without tachometers perform poorly at low velocities.

Thus, the limitations of the prior art with respect to the measurement of velocity at low velocities were serious.

SUMMARY OF THE INVENTION

A unique combination of hardware and microprocessor-driven software can comprise a machine using a very different principle from the prior art, a principle which is capable of substantially better measurement of velocity at low velocities. In fact, the system of this invention measures velocities over five orders of magnitude (a factor of 100,000) with a maximum steady state error of 0.1%. The invention also makes it possible to increase the number of axes on a single circuit board by a factor of three or more.

The solution to the problem of building a servo controller which does not include a tachometer is to measure the time between groups of subsequent quadrature transitions. As applied to a rotary shaft, the invention employs a rotary-position sensor which produces what is known as "discrete quadrature", which is a two-bit digital signal in Gray code. As the rotary-position sensor rotates through a fixed angle, the quadrature signal changes. The term "quadrature transition" is used to refer to the movement of the rotary-position sensor through a sufficient angle for the sensor's quadrature output to advance to the subsequent Gray code pattern. A group of quadrature transitions is two ro more quadrature transitions. The terms "count" or "position count" means the rotary-position sensor's shaft angle between subsequent quadrature transitions. The term "position" means the number of position counts from a reference zero count. The term "velocity" then means the number of counts per second at which the rotary-position sensor is turning.

The invention thus includes a method for measuring the velocity of a servo shaft driven cyclically by a motor, without employing a tachometer. The method begins by producing from movement of the shaft (axis) a pair of signal in quadrature with transitions expressible in Gray code for each cycle as 00, 01, 11, 10 and then back to 00. It also produces, as from a clock, a large number of evenly spaced pulses per group of quadrature transitions at all speeds of the shaft. The method continues by reading the number of clock pulses between two selected quadrature transitions, and then determines the velocity by dividing the total number of quadrature transitions between the selected transitions by the total number of clock pulses during the same time.

More specifically, the method comprises reading through a FIFO (first-in, first-out) memory a first time when a selected quadrature transition occurred, subtracting from said first time a second time of a preceding selected quadrature transition in order to obtain the number of clock pulses between two selected quadrature transitions.

In certain instances, the method includes dividing the number of quadrature transitions by a suitable factor before routing them to the FIFo memory in order to avoid having the computer fall behind said FIFO memory. The same factor is subsequently used as a multiplier at the computer. Preferably, the computer determines the factor and controls its application.

When applying the method to a plurality of different servo shafts, the method provides for multiplexing the input quadrature and latching in the FIFO the identity of each shaft to the counts and quadrature identities applying to it.

The method applies both to a rotating shaft and a reciprocating shaft, and it includes determining from the sequence of the Gray code transitions the direction of shaft movement.

The apparatus of the invention basically comprises quadrature means for producing from movement of the shaft a pair of signals in quadrature with transitions expressible in Gray code for one cycle as 00, 01, 11, 10 and then back to 00, clock means for providing a large number of evenly spaced counts per group of quadrature transitions at all speeds of the shaft, reading means for determining the number of counts between two selected quadrature transitions, and computer means for dividing the total number of quadrature transitions between the selected transitions by the total number of counts during the same time.

As implied above, the apparatus may include FIFO memory means for receiving the number of counts and sending this number to the computer means. Also, there is preferably programmable dividing means preceding the FIFO memory means for dividing the number of quadrature transitions (counts) by a selected factor in order to enable the computer to keep current with the output from the FIFO memory means. This computer means preferably includes means for determining when such factor is needed and what the factor should be, and for supplying the factor to the programmable divider means and the reciprocal thereof to the portion of the computer performing its own dividing step.

When the apparatus is used with a plurality of shafts, it includes multiplexing means for sending appropriate signals from each shaft and latching means in the FIFO memory means for linking the appropriate data with the correct shaft. The systems also have direction determining means in the computer actuated by the cyclic order of the Gray code for determining the direction of movement of the shaft.

The benefit of the present art approach is seen by examining the precision of the measurement. In the prior art, the precision was shown to be one part in one or a possible error of 100%. In the present art, the precision is the precision with which the time between the selected quadrature transitions is measured. If the time is, for example, measured in microseconds and sampled every millisecond, the error is reduced to one part in one thousand or 0.1%.

EXPLANATION OF THE PRIOR ART

Figure 1:
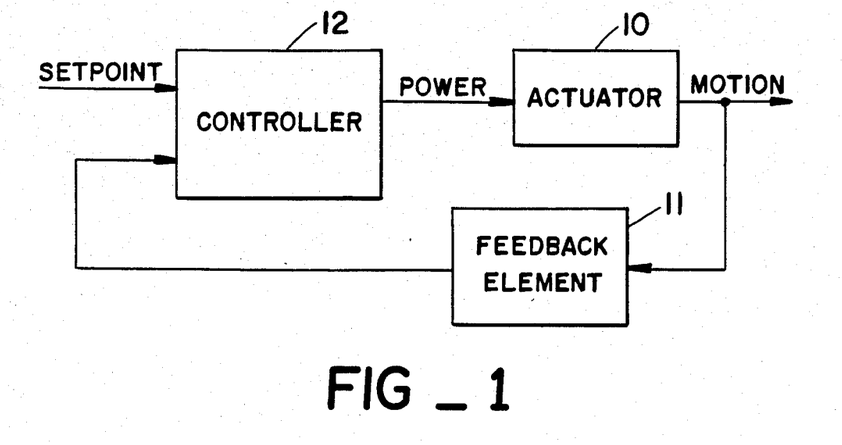
FIG. 1 is a block diagram of the main elements of a motion control system.

FIG. 1 summarizes the main elements of a motion control system which are important for the discussion of this invention. A preferred motion control system comprises up to three elements: an actuator 10 causes the motion, an optional feedback element 11 measures position or velocity or both—and is connected to a controller 12 which applies power to the actuator 10 in order to effect a desired motion goal or controller setpoint, such as a desired position, velocity, or acceleration.

Figure 2:
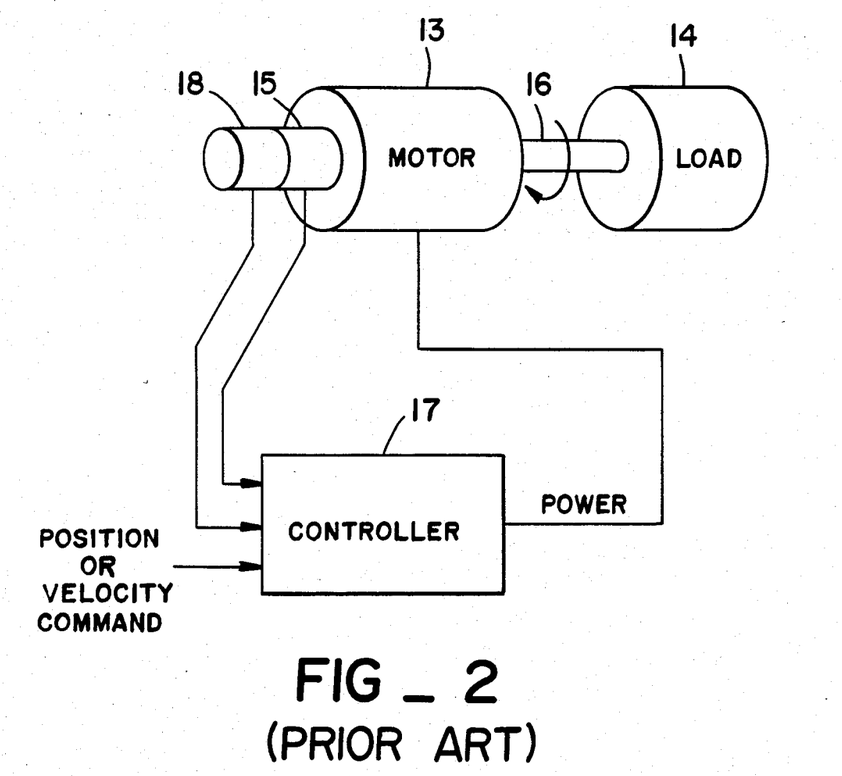
FIG. 2 is a diagrammatic representation of a prior art system employing a tachometer.

FIG. 2 depicts a tachometer-using system illustrative of the prior art. A DC motor 13 drives a load 14. The motor 13 also drives a tachometer 15 which produces a signal proportional to the rotational velocity of a shaft 16. A controller 17 uses the signal from the tachometer 15 to measure the velocity of the load 14. A rotary position feedback element or encoder 18 allows the controller 17 to determine the position of the load 14. The controller accepts, commands and controls the speed or position of the load 14.

Figures 3, 4:
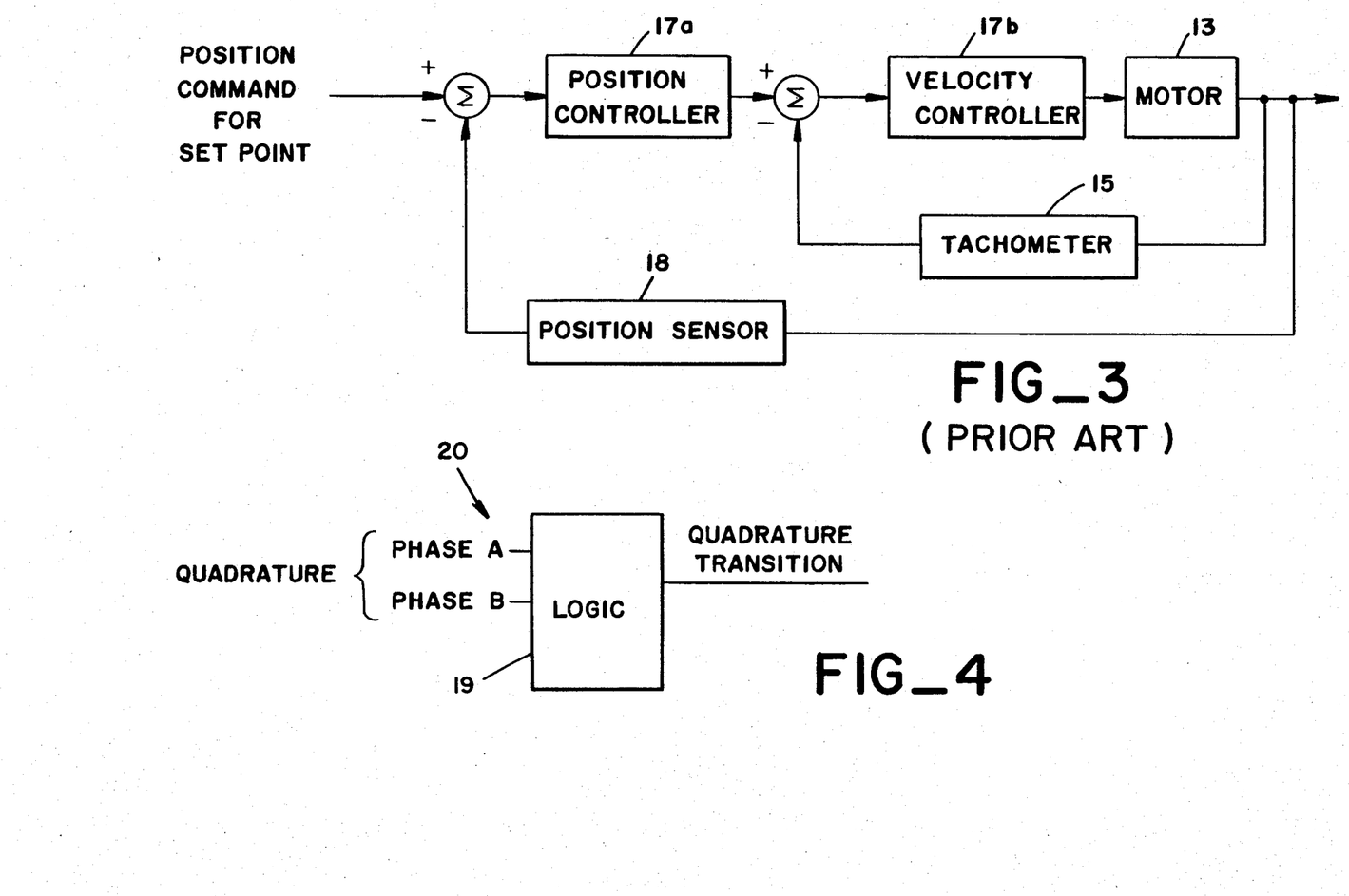
FIG. 3 is a prior-art controller block diagram.
FIG. 4 is a simplified view of the developmental quadrature.

FIG. 3 is a controller block diagram which is typical of those used for closed-loop motion control. Other controller configurations are possible, but they would be similar in their use of a signal from a load speed sensor (tachometer) 15 and a position sensor 18. In FIG. 3, a two-part controller 17a, 17b, is given a desired position and determines the position error by taking the difference between the desired position and the actual position as measured by the position sensor 18, which is the rotary position feedback element. The position controller 17a uses this position error to generate a desired velocity; that is, as the position error decreases, so does the desired velocity. A velocity controller 17b then uses the desired velocity and the tachometer velocity feedback signal to determine the value of the motor actuation signal. Motion control systems using a control strategy such as this are used in a myriad of industrial process control applications.

DETAILED DESCRIPTION OF THE INVENTION

FIG. 4 is a simplified view of the manner in which quadrature is developed from a quadrature apparatus 20. As though there were two marks on a shaft exactly 90° apart, with each developing a signal, there are two phases, phase A and phase B, which are sent to a logic circuit 19 from which a quadrature transition signal is the output.

Figure 5:
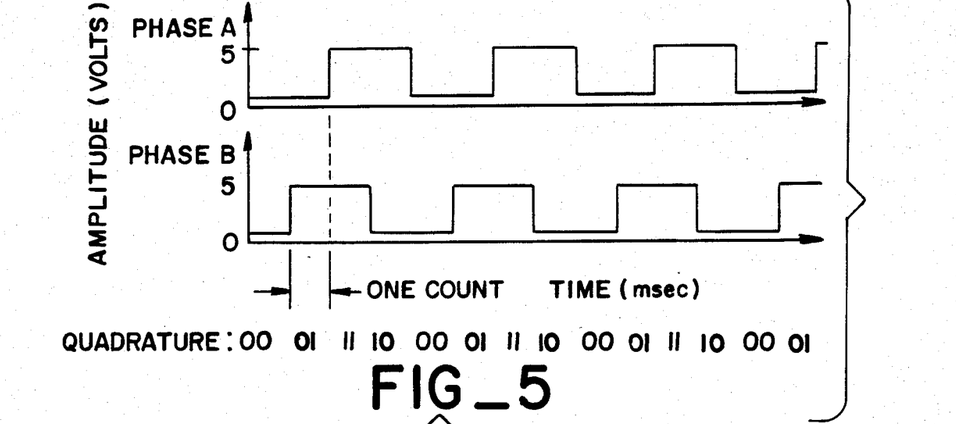
FIG. 5 is a diagram of typical TTL quadrature, with amplitudes in volts along the vertical axis and in milliseconds along the longitudinal axis.

FIG. 5 shows the quadrature transition signal as derived from two square wave signals, placed 90° apart. When both are at their minimum value (at the left end of FIG. 5), the signal is at 00. Ninety degrees of shaft rotation later, phase B goes to its maximum, making the first quadrature transition from 00 to 01 in the Gray code. Ninety degrees from there, phase A goes to maximum and makes the second transition, from 01 to 11. At another ninety degrees of shaft rotation, phase B drops to its minimum value, for the third transition from 11 to 10 in Gray code. The cycle is completed ninety degrees later with phase A dropping to zero, so that the fourth transition is from 10 to 00.

Figure 6:
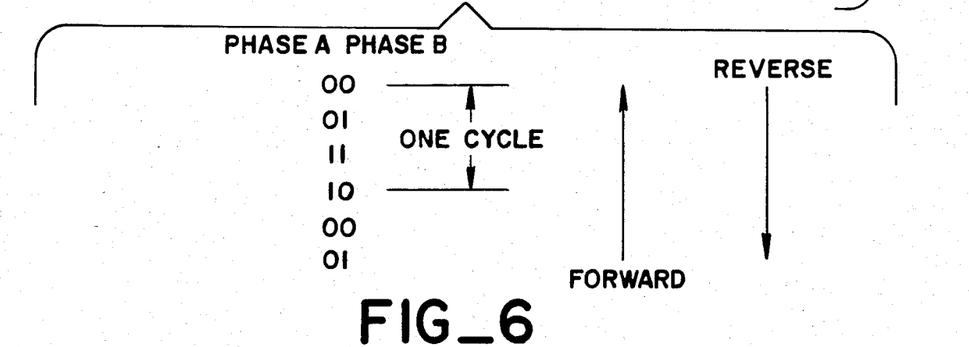
FIG. 6 is a Gray code diagram showing the transitions for one cycle and how direction an be deduced for subsequent values of the quadrature of FIG. 5 as indicated in its longitudinal axis.

FIG. 6 tabulates slightly more than one cycle in Gray code, shows the span of the cycle, and shows how the order of the Gray code transition enables one to know when the movement is "forward" or "reverse". This may mean the direction of rotation or of reciprocation.

Thus, the term "quadrature transition" means the movement of the rotary-position sensor through a sufficient angle for the sensor's quadrature output to advance to the subsequent Gray code pattern.

The terms "counts" or "position count" mean the rotary-position sensor's shaft angle between subsequent quadrature transitions. The term "position" means the number of position counts from a reference zero count. The term "velocity" means the number of counts per second at which the rotary-position sensor is turning.

Figure 7:
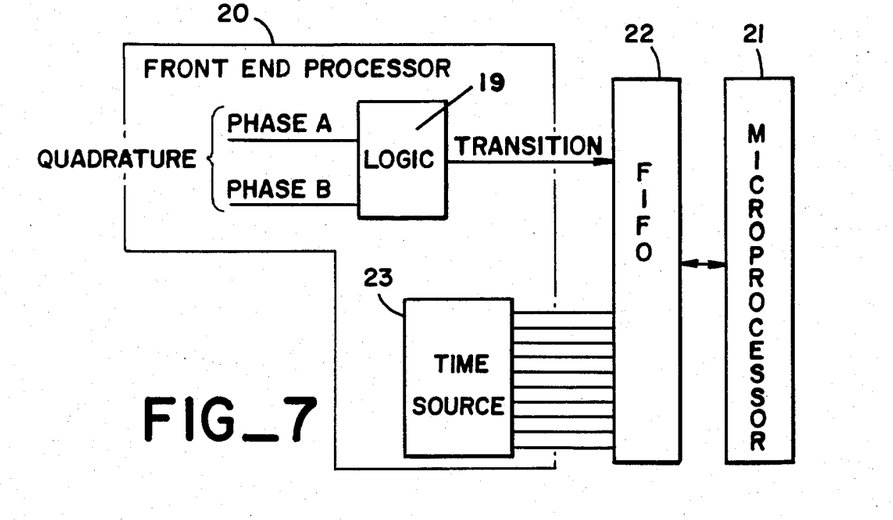
FIG. 7 is a block diagram of a simplified system exemplifying the principles of the present invention.

FIG. 7 exemplifies a simplified form of the invention. The quadrature apparatus of FIG. 4 is here termed a front end processor 20 and it is linked to a microprocessor or computer 21. The computer 21 maintains overall control of the front end processor 20. Because the front end processor 20 can process quadrature transitions faster than can the computer 21, a buffer is placed between the front end processor 20 and the computer 21. This buffer is a first-in-first-out memory 22 which is known as a FIFO. The FIFO 22 is capable of being written to by the front end processor 20 for a short period of time at a rate faster than the computer 21 can read from the FIFO 22. The nature of the front end processor 20 is such that the capacity of the FIFO 22 will not be exceeded. A time source 23 supplies the time to the FIFO 22.

Figure 8:
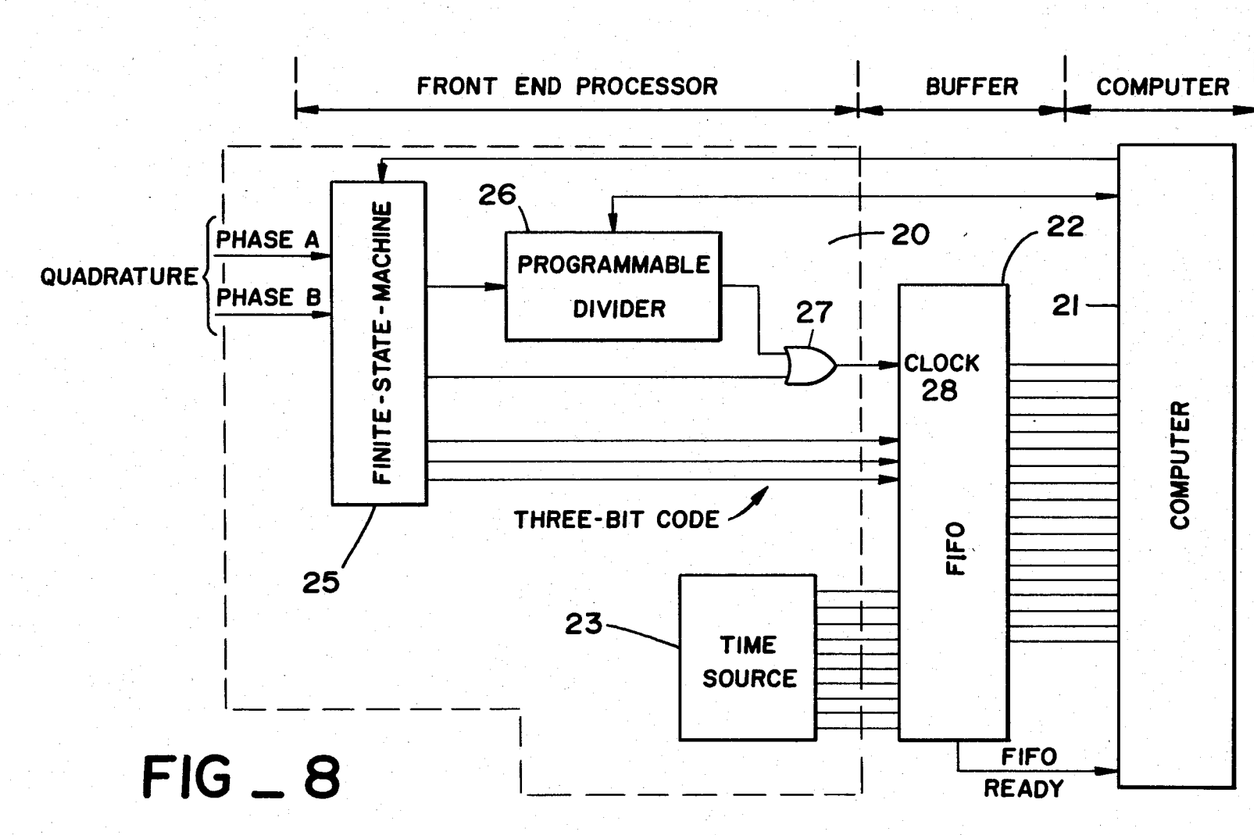
FIG. 8 is a block diagram embodying a more complete form of the invention.

FIG. 8 shows a preferred embodiment of a single axis circuit utilizing the present art. This circuit includes the front end processor 20 and a computer or microprocessor 21. When coupled to the front end processor 20, the computer 21 is able to determine the position and velocity of a single axis of quadrature. It is important to note that the front end processor 20 does not itself maintain the position of the axis nor does it measure the velocity. Only in conjuction with the computer 21 does the front end processor 20 enable the computer 21 to measure position and velocity. The prior art typically contains dedicated circuitry which maintains the current position, and if a computer is used, the computer merely reads the position count from this dedicated circuitry. FIG. 8 is slightly simpler than the circuit diagram which was used for the system reduced to practice (see FIGS. 10A, 10B, and 10C), since incorporation of several integrated circuits into a single diagram block eases the understanding of the concept. However, FIG. 8 includes the essential parts of the concept, and accurately describes the invention.

In FIG. 8, a finite state machine 25 provides the logic 19 but accepts as inputs the quadrature from an axis of servo. The finite state machine 25 detects transitions of the quadrature and responds to every transition of the quadrature. The method in which it responds is dependent upon both the type of quadrature transition which occurs and also the input it receives from the computer 21. The FIFO 22 accepts inputs from the finite state machine 25 and the time souce 23. A programmable divider 26 accepts inputs from the finite state machine 25, and sends its output via an OR gate 27 to a clock 28 of the FIFO 22. When a signal arrives at the clock input 28 in the FIFO 22, the FIFO 22 latches the time presented by the time source 23 as well as the signals from the finite state machine 25.

In order to describe the operation of the preferred embodiment, a number of typical signal patterns of input quadrature are presented and it will be shown how the preferred embodiment deals with the signals and how the position and velocity are found.

The term "sample frequency" is used to refer to the rate at which the computer 21 desires to evaluate the position and velocity of the axis. Assume for the following examples that the sample frequency is one thousand Hertz (1 KHz) or equivalently, the sample period is one millisecond (1 msec).

Condition 1:

Assume that the axis (a shaft) is moving slowly in a single direction. Assume also that the axis is traveling at one hundred counts per second (100/sec). Under these conditions, the computer 21 instructs the finite state machine 25 to report all transitions of the quadrature directly to the FIFO 22 and not by way of the programmable divider 26. The finite state machine 25 produces a three-bit code which indicates that the event which is to be written into the FIFO 22 is a "normal, non-divider transition".

The finite state machine 25 causes the FIFO 22 to latch or record the three-bit code as well as the current time as presented by the time source 23. The finite state machine 25 causes the latching by sending a signal to the FIFO 22 via direct passage to the OR gate 27. When a value is written into the FIFO 22, a ready signal becomes true and informs the computer 21 that a value exists to be read from the FIFO 22. When the computer 21 reads the FIFO 22, it checks the three-bit code and determines that the event in the FIFO 22 is a "normal, non-divider" transition. The computer 21 adds one to the current axis position if the axis is moving in a positive direction and subtracts one if it is moving in a negative direction. The computer 21 then subtracts from the time value read from the FIFO 22 the time of the last transition. This difference is the period of the axis. The velocity of the axis is found by inverting the period (velocity=1÷period). This process can repeat indefinitely.

Condition 2:

Assume that the velocity of the axis in Condition 1 increases to fifteen hundred Hertz (1.5 KHz). Two problems will occur unless action is taken. First, the rate of quadrature transitions will overload the computer 21; then the computer 21 will not be able to read the values from the FIFO 22 fast enough. Second, the precision of the measurement of velocity will degrade as the period of the transitions continues to decrease.

In order to solve both of these problems, the computer 21 programs the programmable divider 26 to divide by two. The computer 21 then instructs the finite state machine 25 to route all further transitions to the prgrammable divider 26 and not directly to the FIFO 22. The finite state machine 25 now uses a different code from that used in Condition 1. The finite state machine 25 sends the three-bit code to the FIFO 22 which is "normal transition, divider".

When a quadrature transition occurs, the finite state machine 25 routes the transition to the programmable divider 26. Since the programmable divider has been programmed to divide by two, every other transition will cause the output of the programmable divider 26 to send a transition via the OR gate 27 to the FIFO 22. The FIFO 22 is caused to latch the current time from the time source 23 as well as the three-bit code generated by the finite state machine 25 which is "normal transition, divider".

Just as was the case in Condition 1, the computer 21 senses that a value was latched into the FIFO 22 by means of the ready line. The computer 21 reads the FIFO 22 and determines from the three-bit code that this event is a "normal transition, divider". The computer 21 adds two (the value of the divider) to an internal variable which represents the current axis position if the axis is moving in the positive direction and subtracts two if it is moving in the negative direction. The computer 21 then subtracts from the time value read from the FIFO 22 the time of the last transition. The computer 21 then finds the velocity by taking the inverse of the period and multiplying the result by two (the value of the divider). (velocity=2÷period.) This process can repeat indefinitely.

Condition 3:

Assume that the velocity of the axis in Condition 2 continues to increase to twenty-five hundred Hertz (2.5 KHz). The computer 21 must re-adjust the programmable divider 26. The computer 21 first instructs the finite state machine 25 to route all further transitions directly to the FIFO 22. The computer 21 next reads from the programmable divider 26 the remainder of the programmed count. The computer 21 then adjusts the axis position by the remainder of the programmable divider 26. The remainder of the programmable divider 26 is the count of all transitions which were routed to the programmable divider 26 since the last output of the programmable divider 26. The computer 21 next programs the programmable divider 26 with the new value which—in this case—is three. The computer 21 next instructs the finite state machine 25 to route all further transitions of the quadrature to the programmable divider 26 and not directly to the FIFO 22.

In Condition 3, the use of the FIFO 22 to accept all transitions of the quadrature during the time in which the computer 21 changes the divisor of the programmable divider 26 demonstrates what was stated earlier, that the FIFO 22 is an important circuit element when the front end processor is subjected to quadrature rates which are in excess of the rate at which the computer 21 can remove transitions from the FIFO 22. For example, if the rate of transitions or the velocity of the axis is one million counts per second (1,000,000/sec) and the process of changing the divider takes ten microseconds (10 usec), we expect that ten transitions will be placed in the FIFO 22 during the time in which the computer 21 is changing the divisor of the programmable divider 26. Because these transitions must be counted in order to maintain accuracy of position, the FIFO 22 is an essential component of the preferred embodiment.

If desired, the function of the FIFO 22 could be provided in other circuit forms, especially if implemented with custom integrated circuits.

Conditions 1, 2, and 3 show a trend of increasing velocities. The trend may be extended to the limit of the resolution of the time source 23 or the circuit speeds of the finite state machine 25 or the FIFO 22. When the programmable divider 26 is being used, the computer computes the new divisor to be:

$$\text{divisor} = \text{velocity}/\text{sample-frequency} + 1.$$

If the velocity is less than the sample frequency, the programmable divider 26 is not used, and the remainder of the programmable divider 26 is applied to the axis position as was done in Condition 3.

Condition 4:

The last concept to be covered is axis direction. Assume that the front end processor 20 is functioning as in Condition 1. Then assume that the axis slows to a stop and then begins turning in the opposite direction. Upon the first quadrature transition in the opposite direction, the finite state machine 25 will detect the reversal and change the code which it presents to the FIFO 22 under this condition from "normal, nondivider event" to "direction change".

When the computer 21 reads this transition from the FIFO 22, the computer will change its record of the axis direction. Upon the next transition, therefore, the computer will correctly apply the transition to the axis position.

A Multi-Axis Design

Figure 9:
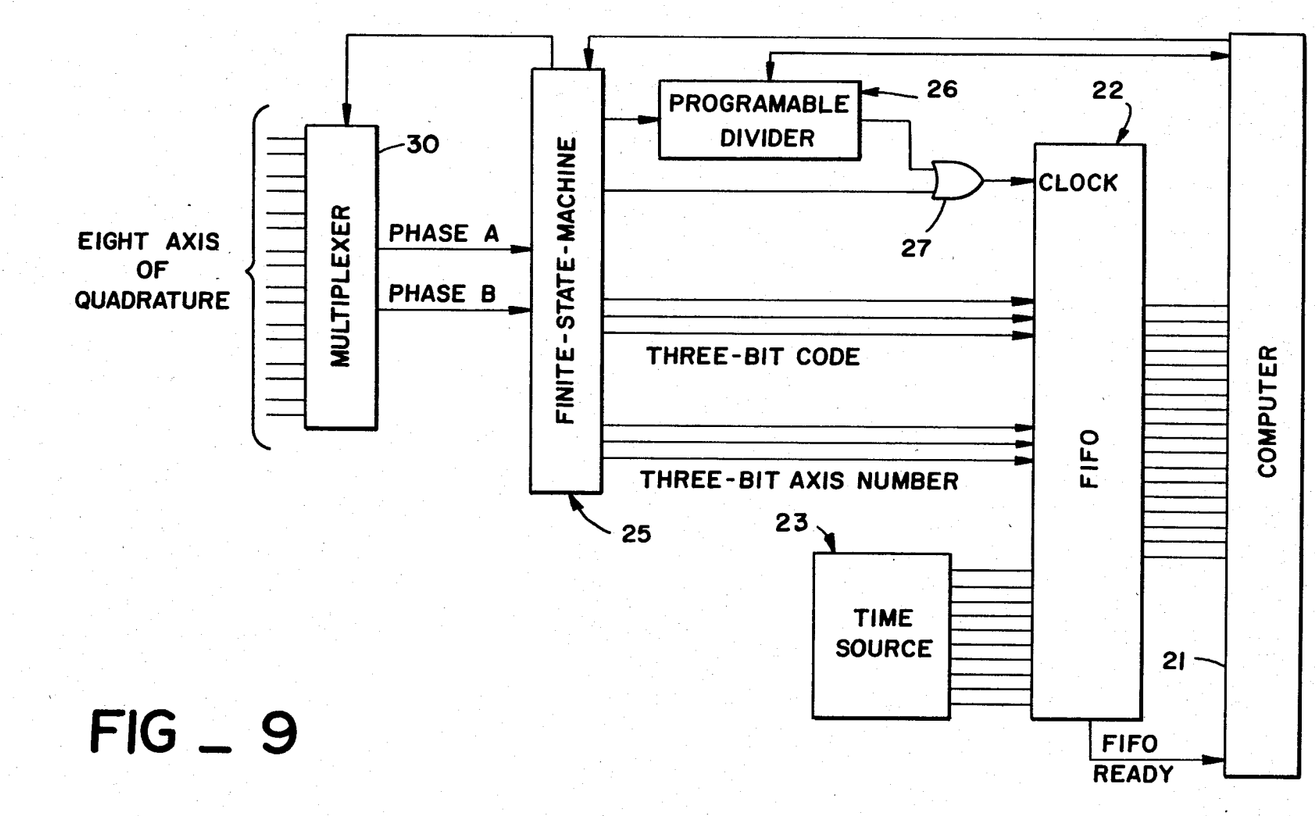
FIG. 9 is a block diagram of a multi-axis system embodying the principle of the invention.

A multi-axis version of the controller has been built by adding only a few components to the single axis design. FIG. 9 shows that the quadrature from eight axes of servo is applied to a multiplexer 30 which allows the finite state machine 25 to examine one of the eight axes by causing the multiplexer 30 to select the desired axis. The finite state machine 25 produces a three-bit axis number which is routed to the FIFO 22. The computer 21 is thus able to read a value from the FIFO 22 and deduce to which axis the transition in the FIFO 22 refers.

Figure 10A:
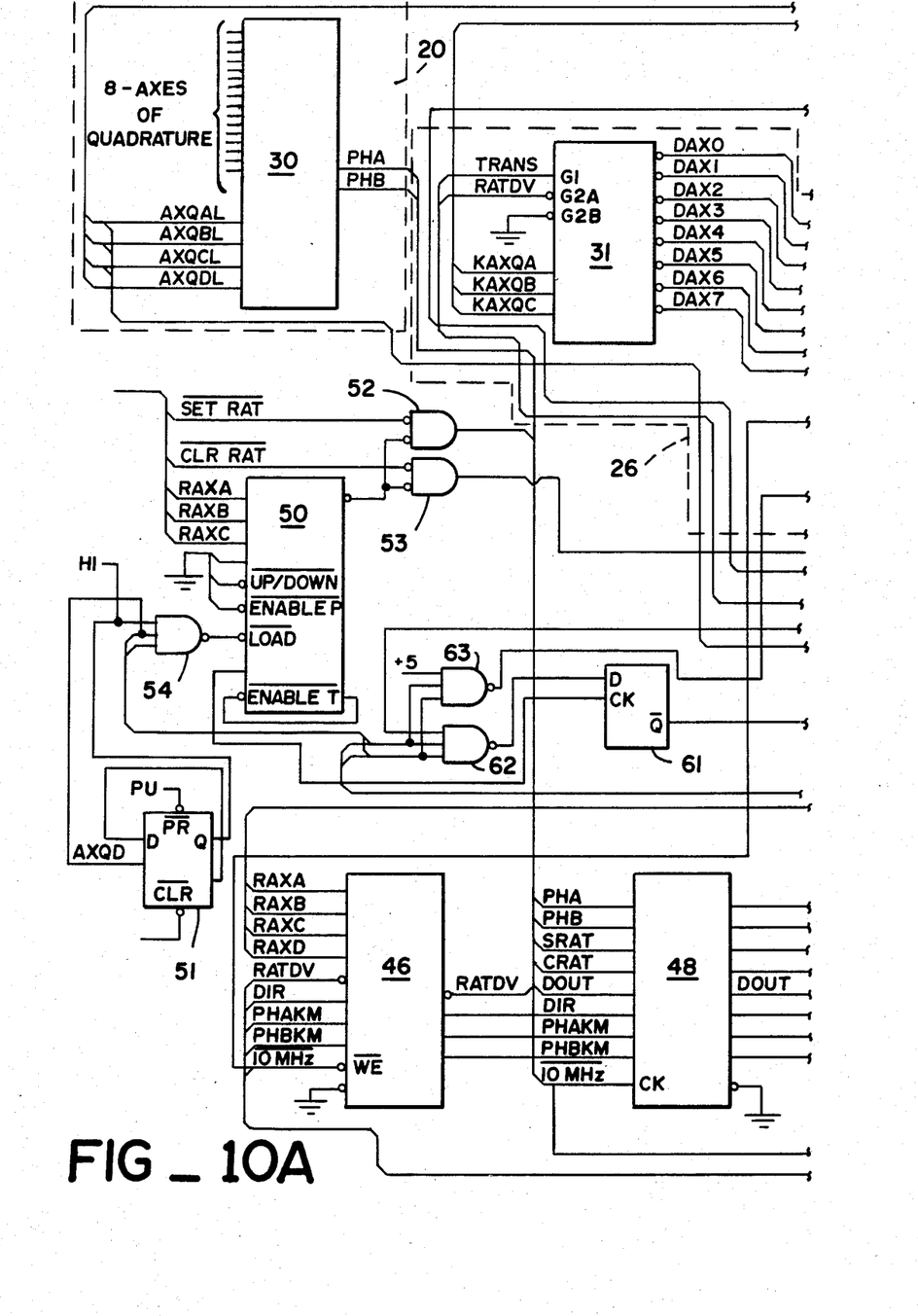
FIGS. 10A, 10B, and 10C comprise a more detailed diagram corresponding to FIGS. 8 and 9 and placed on three separate sheets, though really only a single drawing.
Figure 10B:
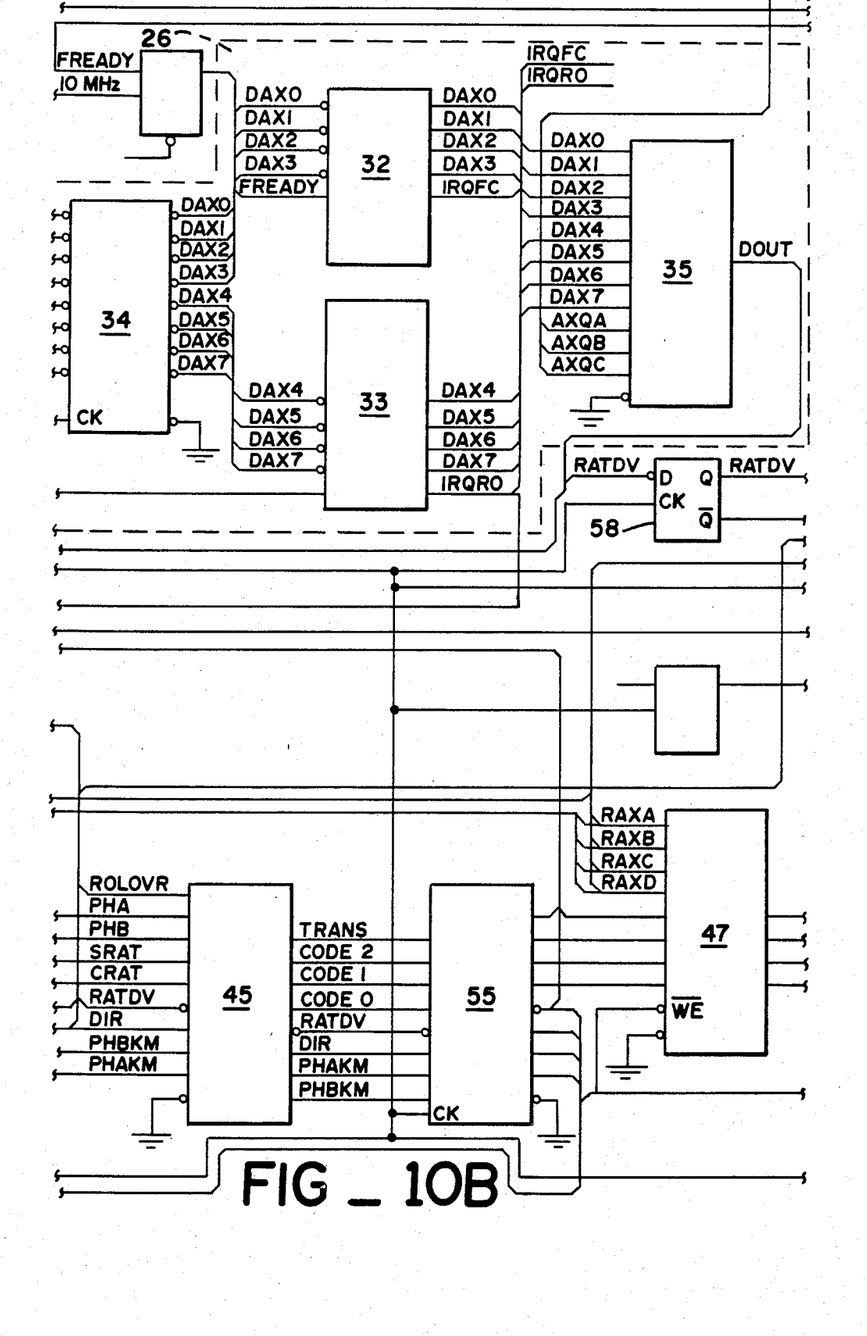
Figure 10C:
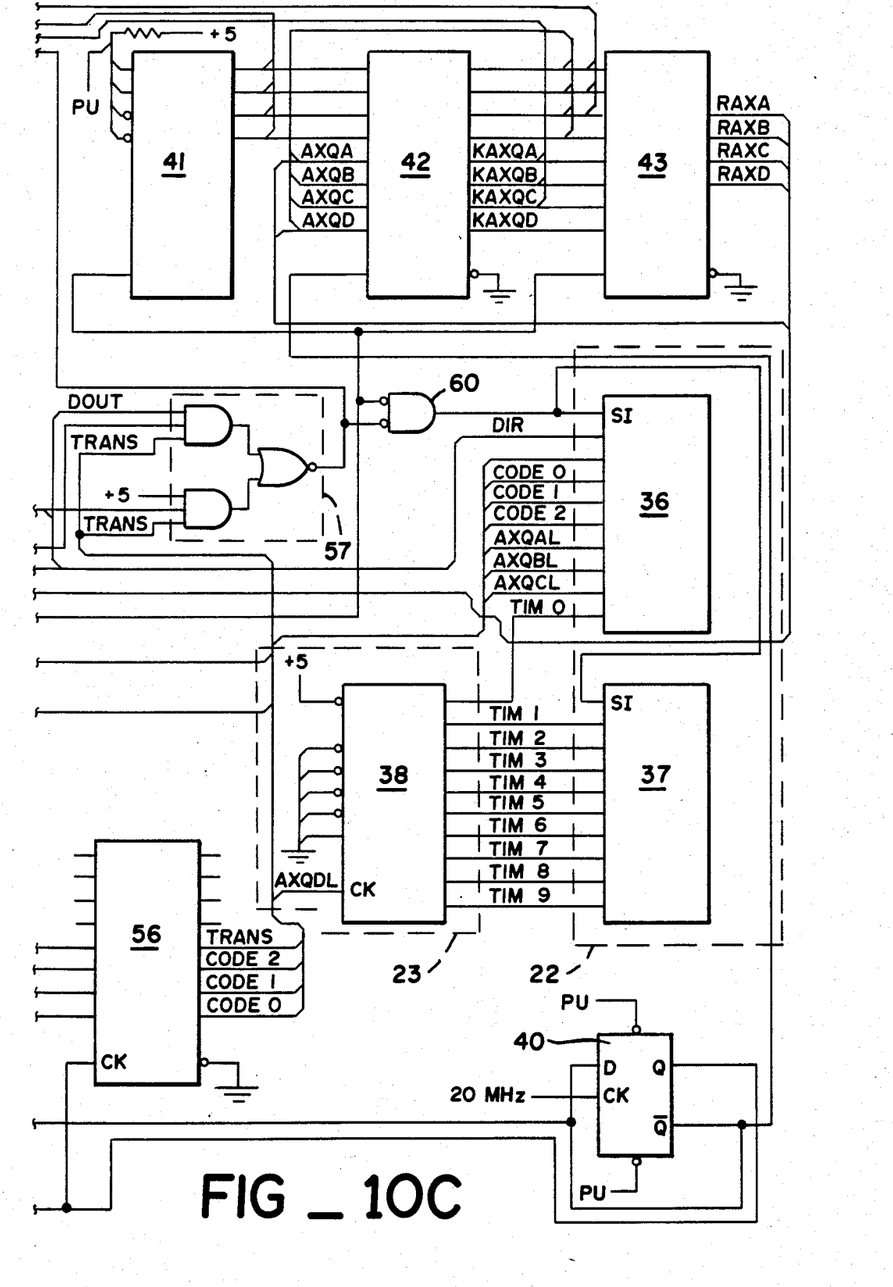

FIGS. 10A, 10B, and 10C comprise a schematic diagram of the front-end processor circuit, which measures the time at which quadrature transitions occur. The computer 21 which interfaces with this circuit and which is shown in FIG. 8 is not shown in FIG. 10. FIG. 10 contains four areas which are surrounded by dashed lines and which are labeled with numbers. These boxed areas represent the blocks shown in FIGS. 8 and 9. All elements which are not boxed are part of the finite state machine 25. In accordance with current electrical circuit drafting convention, the lines having a 45° corner represent buses which contain multiple conductors. Signals are designated at the entry to the bus and only exit from the bus at one point.

A. The Multiplexer 30

The multiplexer 30 (e.g. a PAL 20L2) receives signals from eight axes of quadrature. As described earlier, each axis of quadrature is comprised of two signal lines, thus sixteen lines are shown which connect to the source of the quadrature. The appropriate pair of quadrature signals is selected by the axis number applied as a four-bit value (AXQAL, AXQBL, AXQCL, and AXQDL). The selected quadrature signals are called PHA and PHB.

B. The Programmable Divider 26

A decoder 31 (e.g., a 74S138) is enabled by two signals from the finite state machine 25 called TRANS which indicates that a quadrature transition occurred, and RATDV which indicates that the transition is to be routed to the programmable divider 26. The decoder 31 routes the transition to the appropriate input of either divider 32 (e.g. AMD 9513) or divider 33 (e.g. AMD 9513) via a latch 34 (e.g. 74S374). The transition is routed by the decoder 31 based upon the axis number made up of KAXQA, KAXQB, and KAXQC. The output of the dividers 32 and 33 are routed to a multiplexer 35 (e.g. 74S151) which is addressed by the axis number AXQA, AXQB, and AXQC.

C. The First-In-First-Out (FIFO) Memory 22

When a quadrature transition occurs which is to be recorded by the FIFO 22 the shift in (SI) input to both FIFO portion 36 and FIFO portion 37 (both e.g., TRW TDC 1030) is activated and the time and axis information is stored in the FIFO 22. Ten of the bits of the eighteen available bits are the time, recorded in microseconds. The time is labeled TIM0 through TIM9. Three bits represent the axis number (AXQAL, AXQBL, and AXQCL). Three bits represent the code which indicates what kind of quadrature transition has occurred. The code is named CODE 0, CODE 1, and CODE 2. One bit is the direction in which the indicated axis is moving and is labeled DIR. The final bit is not used in the preferred embodiment and is reserved for future use.

D. The Time Source 23

A ten-bit counter 38 (e.g.74LS491) is clocked at 1 MHz and produces a ten-bit word which is routed to the FIFO portions 36 and 37.

E. The Finite-State Machine 25

The finite-state machine 25 contains a clock driver 40 (e.g. 74S74) which divides a 20 MHz signal and produces a 10 MHz signal and its complement. These signals are used throughout the circuit. The axis number is used by several circuit elements. The axis number is produced by a counter 41 (e.g. 74LS162) and latched by a latch 42 (e.g. 74S374). A multiplexer 43 (e.g. 74S257) is also used to choose between the current axis number and the previous axis number.

The core of the finite-state machine 25 is made up of a read-only memory (ROM) 45 (e.g. 27S29) and two read-write memories (RAM) 46 and 47 (both, e.g. 27S07A). The ROM 45 is presented with the current machine state from one RAM 46 via a latch 48 (e.g. 74S374). The ROM 45 is also presented with the current quadrature state from the multiplexer 30 also via the latch 48. The ROM 45 is also presented with two bits which may be written by the computer 21 and enabled by a counter 50 (e.g. 74LS168), a flip-flop 51 (e.g. 74S74), and gates 52, 53, and 54. These two bits allow the computer 21 to command the front-end processor 20 to route quadrature transitions either through the programmable divider 26 or directly to the FIFO 22.

The ROM 45 is also presented with a bit which indicates that the time source counter 38 is about to roll over. The ROM 45 uses the state information as an address and produces an eight-bit data word which represents the next state. (A listing of the contents of the ROM 45 is included hereinafter as appendix A.) This next state is latched by a latch 55 (e.g. 74S374). Four bits are fed back to the RAM 46 which is addressed by the axis number. Four bits of the next state are fed forward to the second RAM 47 which feeds a latch 56. The output of the latch 56 (e.g. 74S374) is a four-bit word of which three-bits are the code and one bit indicates whether an event should be recorded in the FIFO 36 and 37.

An AND/OR gate 57 uses the signal from a flip-flop 58 (e.g. 74S175) to determine whether the programmable divider 26 or the RAM 56 should determine whether an event is recorded in the FIFOs 36 and 37. The output of the AND/OR gate 57 is routed to a NOR gate 60 which acts to synchronize the clocking of the FIFOs 36 and 37 with the 10 MHz clock.

A flip-flop 61 (e.g. 74S175) and gates 62 and 63 serve to cause the FIFO 36 and 37 to record an event which indicates that the time source counter 38 is about to roll over. If this event were not recorded and the rolling over of the time source counter 38 were not recorded, the computer 21 could not properly determine the time elapsed between quadrature transitions.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

| Appendix A Listing of ROM 45 | | | | | | | | |
|---|---|---|---|---|---|---|---|---|
| 0000000 | ffff | ffe4 | 8181 | 9f82 | 7676 | 7f63 | 1f1f | 1f1f |
| 0000020 | ffef | efe4 | 8185 | 8f82 | 7667 | 6f63 | 0101 | 0101 |
| 0000040 | dfdf | dfc4 | 9696 | 9f83 | 6161 | 7f62 | 3f3f | 3f3f |
| 0000060 | dfcf | cfc4 | 9687 | 8f83 | 6165 | 6f62 | 2121 | 2121 |
| 0000100 | f6f6 | ffe3 | bfbf | bfa4 | 5f5f | 5f5f | 0101 | 1f02 |
| 0000120 | f6e7 | efe3 | bfaf | afa4 | 4141 | 4141 | 0105 | 0f02 |
| 0000140 | e1e1 | ffe2 | 9f9f | 9f84 | 7f7f | 7f7f | 1616 | 1f03 |
| 0000160 | e1e5 | efe2 | 9f8f | 8f84 | 6161 | 6161 | 1607 | 0f03 |
| 0000200 | c1c1 | dfc2 | 9f9f | 9f9f | 7f7f | 7f64 | 3636 | 3f23 |
| 0000220 | c1c5 | cfc2 | 8181 | 8181 | 7f6f | 6f64 | 3627 | 2f23 |
| 0000240 | d6d6 | dfc3 | bfbf | bfbf | 5f5f | 5f44 | 2121 | 3f22 |
| 0000260 | d6c7 | cfc3 | a1a1 | a1a1 | 5f4f | 4f44 | 2125 | 2f22 |
| 0000300 | dfdf | dfdf | b6b6 | bfa3 | 4141 | 5f42 | 3f3f | 3f24 |
| 0000320 | c1c1 | c1c1 | b6a7 | afa3 | 4145 | 4f42 | 3f2f | 2f24 |
| 0000340 | ffff | ffff | a1a1 | bfa2 | 5656 | 5f43 | 1f1f | 1f04 |
| 0000360 | e1e1 | e1e1 | a1a5 | afa2 | 5647 | 4f43 | 1f0f | 0f04 |
| 0000400 | f0f0 | f0f0 | b0b0 | b0b0 | 7070 | 7070 | 3030 | 3030 |
| 0000420 | e0e0 | e0e0 | a0a0 | a0a0 | 6060 | 6060 | 2020 | 2020 |
| 0000440 | d0d0 | d0d0 | 9090 | 9090 | 5050 | 5050 | 1010 | 1010 |
| 0000460 | c0c0 | c0c0 | 8080 | 8080 | 4040 | 4040 | 0000 | 0000 |
| 0000500 | f0f0 | f0f0 | b0b0 | b0b0 | 7070 | 7070 | 3030 | 3030 |
| 0000520 | e0e0 | e0e0 | a0a0 | a0a0 | 6060 | 6060 | 2020 | 2020 |
| 0000540 | d0d0 | d0d0 | 9090 | 9090 | 5050 | 5050 | 1010 | 1010 |
| 0000560 | c0c0 | c0c0 | 8080 | 8080 | 4040 | 4040 | 0000 | 0000 |
| 0000600 | f0f0 | f0f0 | b0b0 | b0b0 | 7070 | 7070 | 3030 | 3030 |
| 0000620 | e0e0 | e0e0 | a0a0 | a0a0 | 6060 | 6060 | 2020 | 2020 |
| 0000640 | d0d0 | d0d0 | 9090 | 9090 | 5050 | 5050 | 1010 | 1010 |
| 0000660 | c0c0 | c0c0 | 8080 | 8080 | 4040 | 4040 | 0000 | 0000 |
| 0000700 | f0f0 | f0f0 | b0b0 | b0b0 | 7070 | 7070 | 3030 | 3030 |
| 0000720 | e0e0 | e0e0 | a0a0 | a0a0 | 6060 | 6060 | 2020 | 2020 |
| 0000740 | d0d0 | d0d0 | 9090 | 9090 | 5050 | 5050 | 1010 | 1010 |
| 0000760 | c0c0 | c0c0 | 8080 | 8080 | 4040 | 4040 | 0000 | 0000 |
| 0001000 | | | | | | | | |

What is claimed is:

1. A method for measuring the velocity of a servo shaft driven cyclically by a motor, without employing a tachmeter, comprising the steps of:
   producing from movement of said shaft a pair of overlapping square-wave signals in quadrature with transitions expressible in Gray code for each cycle,
   producing from a clock a large number of evenly spaced clock pulses per a selected number of quadrature transitions,
   reading the number of clock pulses between two selected quadrature transitions, and dividing the total number of quadrature transitions between said selected transitions by the total number of clock pulses during the same time.

2. The method of claim 1 wherein said shaft is a reciprocating shaft.

3. The method of claim 1 including determining from the sequence of the Gray code transitions the direction of shaft movement.

4. The method of claim 1 including continuously performing said production, reading, and dividing steps in cycle.

5. The method of claim 1 wherein the step of reading the number of clock pulses includes reading through a first-in-first-out memory a first time at which a selected quadrature transition occurred, subtracting from said first time a second time of a preceeding selected quadrature transition in order to obtain the number of clock pulses between two selected quadrature transitions.

6. The method of claim 5 including dividing the number of quadrature transitions by a suitable factor, before routing them to said memory, in order to adequately process the data from said memory, and then multiplying by the same factor at the computer.

7. The method of claim 6 having the step of determining in said computer the value of said factor and controlling its application to said dividing step.

8. The method of claim 7 as applied to a plurality of different servo shafts, comprising the steps of multiplexing the input quadrature and latching in said memory the identity of each shaft to the counts and quadrature indentities applying to it.

9. Apparatus for measuring the velocity of a servo shaft driven by a motor, without employing a tachometer, comprising:
   quadrature means for producing from movement of said shaft a pair of overlapping square-wave signals in quadrature with transitions expressible in Gray code,
   clock means for providing a large number of evenly spaced clock pulses per a selected number of quadrature transitions,
   reading means for determining the number of clock pulses between two selected quadrature transitions, and
   computer means for dividing the total number of quadrature transitions between said selected transitions by the total number of clock pulses during the same time.

10. The apparatus of claim 9 having direction determining means actuated by the cyclic order of the Gray code for determining the direction of movement of said shaft.

11. The apparatus of claim 9 comprising first-in-first-out memory means and computer means for utilizing the number of clock pulses and the number of quadrature transitions to determine the average time between two sequential quadrature transition between the selected ones.

12. The apparatus of claim 11 comprising programmable dividing means preceding said memory means for dividing the number of quadrature transitions by a suitable factor and supplying the result of such division to said memory means, in order to enable said computer to keep current with the output from said first-in-first-out memory means.

13. The apparatus of claim 12 wherein said computer means includes means for determining when a said suitable factor is needed and what the factor should be, and for supplying the factor to said programmable divider means and the reciprocal thereof to the portion of said computer performing its own dividing step.

14. The apparatus of claim 13 for use with a plurality of said shafts, including multiplexing means for sending appropriate signals from each shaft and latching means in said memory means for linking the appropriate data with the correct said shaft.

15. A method for measuring the velocity and position of a servo shaft driven cyclically by a motor, without employment a tachometer, comprising the steps of:
   producing from movement of said shaft a pair of overlapping square-wave signals in quadrature with transitions expressible in Gray code for each cycle,
   producing from a clock a large number of evenly spaced clock pulses per a selected number of quadrature transitions,
   dividing the total number of quadrature transitions between said selected transitions by the total number of clock pulses during the same time to determine the velocity of the shaft,
   utilizing the number of quadrature transitions between the selected quadrature transitions to update the position of the shaft relative to the latest quadrature transition.

16. The method of claim 15 including the step of dividing the number of quadrature transitions by a suitable factor before routing them to said memory, in order to adequately process the data from said memory, and subsequently adjusting the position data by the same factor.

* * * * *

UNITED STATES PATENT AND TRADEMARK OFFICE
CERTIFICATE OF CORRECTION

PATENT NO. : 4,639,884
DATED : January 27, 1987
INVENTOR(S) : Paul Sagues

It is certified that error appears in the above-identified patent and that said Letters Patent are hereby corrected as shown below:

Col. 2, line 67
    "used: should read --uses--.
Col. 3, line 32,
    "counter" should read --counts--.
Col. 3, line 36
    "is" should read --in--.
Col. 3, line 39
    "1,000" should read --1.000--.
Col. 3, line 41
    "1,001" should read --1.001--.
    "1234" should read --2234--.
Col. 3, line 43
    "0.0001-" should read --0.001--.
Col. 4, line 52
    "signal" should read --signals--.
Col. 5, line 3
    "FIFo" should read --FIFO--.
Col. 6, line 5
    "an" should read --can--.
Col. 11, line 47
    "fron" should read --from--.

Signed and Sealed this

Twenty-seventh Day of December, 1988

*Attest:*

DONALD J. QUIGG

*Attesting Officer*      *Commissioner of Patents and Trademarks*